J. G. GAVLAK.
KITCHEN UTENSIL.
APPLICATION FILED JULY 25, 1917.

1,290,168.  Patented Jan. 7, 1919.

WITNESS
R. F. Dilworth

INVENTOR.
Joseph G. Gavlak
By Max H. Srolong
his attorney

UNITED STATES PATENT OFFICE.

JOSEPH G. GAVLAK, OF MONONGAHELA, PENNSYLVANIA.

KITCHEN UTENSIL.

1,290,168. Specification of Letters Patent. Patented Jan. 7, 1919.

Application filed July 25, 1917. Serial No. 182,610.

*To all whom it may concern:*

Be it known that I, JOSEPH G. GAVLAK, a citizen of the United States of America, residing at Monongahela, county of Washington, and State of Pennsylvania, have invented certain new and useful Improvements in Kitchen Utensils, of which the following is a specification.

This invention relates to kitchen utensils, more particularly a dough raising device, and has for its object to provide a utensil of such class, in a manner as hereinafter set forth, which will enable a housewife to quickly raise a batch of dough so that same can be baked.

A further object of the invention is to provide a kitchen utensil including means whereby it can be employed as a vegetable steamer or cooker and preserving kettle when occasion so requires.

Further objects of this invention are to provide a kitchen utensil for the purpose set forth which is simple in its construction and arrangement, strong, durable, efficient and convenient in its use, readily set up and inexpensive to manufacture.

With the foregoing and other objects in view the invention consists of the novel construction, combination and arrangement of parts, hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views.

Figure 1:
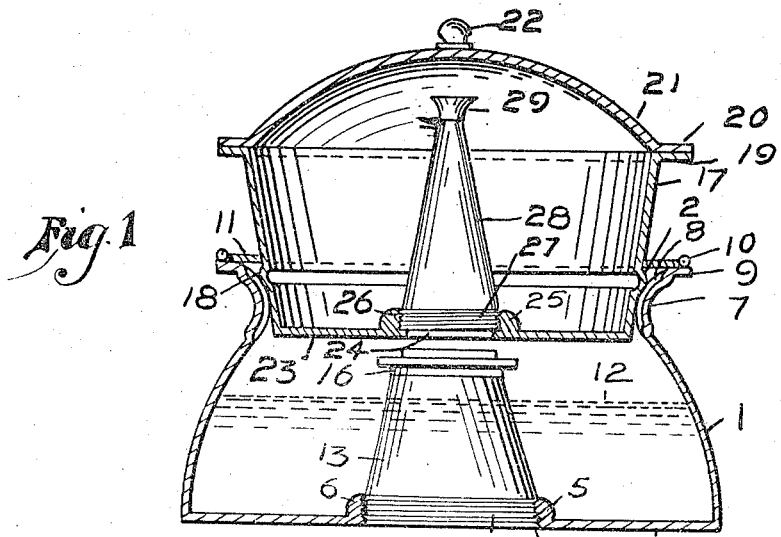
Figure 1 is a vertical view of the kitchen utensil in accordance with this invention.
Figure 3:
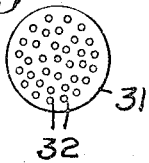
Fig. 3 is a plan view of the jet disk.
Figure 2:
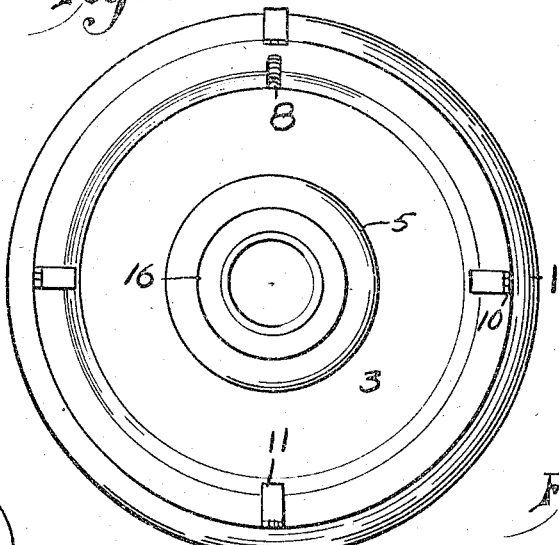
Fig. 2 is a plan.
Figure 4:
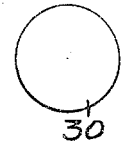
Fig. 4 is a view of the closure disk for the cooker.
Figure 5:
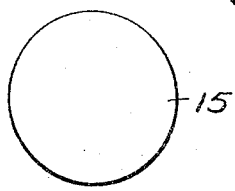
Fig. 5 is a plan view of the closure disk for the boiler.

The kitchen utensil in accordance with this invention comprises a boiler and a cooker, the former consists of an annular body portion 1, having the upper part thereof inset as at 2, to provide a seat for the cooker, the latter being tapering and will be hereinafter referred to.

The body portion 1 of the boiler is open at its top and has a flat bottom 3, formed integral with the lower end thereof. The bottom 3 has a circular opening 4 at the center thereof, and the upper face of said bottom 3 is formed with an integral annular collar 5, which forms a continuation of the opening 4. The inner face of the collar 5, and the wall of the opening 4 have screw threads 6.

The in-set portion of the body 1, at equidistant points is out-set, as at 7, to provide steam out-let passages 8. The top of the body 1, has an annular lateral flange 9, and pivotally connected therewith, at equidistant points, as at 10, are closure flaps 11, for the outlet passages 8.

The boiler is adapted to contain a body of water 12, and when steam is generated it exhausts out through the outlet passages 8, as the pressure of the steam will raise the flaps 11 outwardly, thereby opening the outlets 8.

Adapted to be arranged within the boiler is a frusto-conical sleeve 13, which has its lower end provided with peripheral threads 14, whereby said sleeve 13 can be detachably secured to the threads 6, so as to be maintained in an upright position within the boiler, centrally thereof. The sleeve 13 is of less height than the boiler 1. The bottom 3, when the sleeve 13 is not employed is closed by a disk 15.

Figure 6:
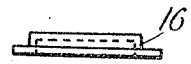
Fig. 6 is a side view of the closure cap for the sleeve of the boiler.

When the sleeve 13 is employed, to prevent the heat passing entirely therethrough, it may be closed by a removable cap 16, Figs. 1 and 6.

The cooker consists of a tapering body portion 17 having a peripheral bead 18, near its lower end, which engages the inset portion 7 of the body 1 to arrest downward movement of the body 17 when the cooker is mounted within the upper portion of the boiler. The body 17, at its top, has an annular peripheral flange 19, upon which is seated the flange 20 of the lid 21, which is dome shaped and provided with a handle 22.

Formed integral with the body 17 is a bottom 23, having a central opening 24, and further provided with an integral collar 25 on its upper face, and said collar 25 is arranged in alinement with the opening 24.

The collar 25 has interior threads 26 which detachably engages the peripheral threads 27, formed on the lower portion of a hollow cone 28, the latter being open at its upper end as well as having said upper end flaring as at 29.

If it is not desired to employ the cone 28, the bottom 23 may be closed by a disk 30, the cone 28 being removed.

In some instances it may be desirable to have jets of steam projected into the cooker 17, if so, the cone 28 is removed and a disk 31, having jet openings 32, is secured in the bottom 23 of the cooker.

Owing to the manner of setting up the utensil it cannot only be employed as a cooker, bread raiser, or preserving kettle, but also can be used as a steamer or boiler.

The cooker can be employed for raising dough, cooking preserves or steaming vegetables, if desired.

What I claim is:

1. A utensil for the purpose set forth, comprising, a boiler, a cooker extending in the upper portion of the boiler, said boiler and said cooker, each having its bottom provided with an opening, an interiorly threaded collar integral with the bottom of the cooker and registering with the opening in said bottom, an interiorly threaded collar integral with the bottom boiler and registering with the opening in said bottom, and means for closing the opening in the bottom of the boiler.

2. A utensil for the purpose set forth, comprising a boiler, a cooker extending in the upper portion of the boiler, said boiler and said cooker, each having its bottom provided with an opening, an interiorly threaded collar integral with the bottom of the cooker and registering with the opening in said bottom, an interiorly threaded collar integral with the bottom boiler and registering with the opening in said bottom, and hollow conical elements having threaded lower ends adapted to be detachably connected to said collars and superposed with respect to each other.

3. A utensil for the purpose set forth, comprising a boiler, a cooker extending in the upper portion of the boiler, said boiler and said cooker, each having its bottom provided with an opening, an interiorly threaded collar integral with the bottom of the cooker and registering with the opening in said bottom, an interiorly threaded collar integral with the bottom boiler and registering with the opening in said bottom, and hollow conical elements adapted to be detachably connected to said collars and superposed with respect to each other, and means detachably mounted upon the top of the conical element of the boiler for closing it.

4. A utensil for the purpose set forth, comprising a boiler, a cooker extending in the upper portion of the boiler, said boiler and said cooker, each having its bottom provided with an opening, an interiorly threaded collar integral with the bottom of the cooker and registering with the opening in said bottom, and an interiorly threaded collar integral with the bottom boiler and registering with the opening in said bottom, said boiler having the upper portion of its body inset and formed with steam outlet channels and pivoted flaps for closing the upper ends of said channels, and means for closing and opening the bottom of the boiler.

In testimony whereof I affix my signature in the presence of two witnesses.

JOSEPH G. GAVLAK.

Witnesses:
MAX H. SROLOVITZ,
LUELLA H. SIMON.

Copies of this patent may be obtained for five cents each, by addressing the "Commissioner of Patents, Washington, D. C."